(12) United States Patent
Muffoletto et al.

(10) Patent No.: US 7,038,901 B2
(45) Date of Patent: May 2, 2006

(54) SILICATE ADDITIVES FOR CAPACITOR WORKING ELECTROLYTES

(75) Inventors: Barry Muffoletto, Alden, NY (US); Yanming Liu, Clarence Center, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 12 days.

(21) Appl. No.: 11/056,789

(22) Filed: Feb. 11, 2005

(65) Prior Publication Data

US 2005/0180094 A1    Aug. 18, 2005

Related U.S. Application Data

(60) Provisional application No. 60/544,446, filed on Feb. 13, 2004.

(51) Int. Cl.
    *H01G 9/00* (2006.01)
(52) U.S. Cl. ............... 361/523; 361/525; 361/528; 361/529; 361/530; 29/25.03
(58) Field of Classification Search ............... 361/523, 361/525–534, 512, 524; 29/25.03; 252/62.2
    See application file for complete search history.

(56) References Cited

U.S. PATENT DOCUMENTS

| | | | |
|---|---|---|---|
| 2,890,394 A * | 6/1959 | Stephenson et al. ........ 361/505 |
| 3,930,881 A | 1/1976 | Cestaro et al. | |
| 4,211,828 A | 7/1980 | Peck | |
| 5,140,502 A * | 8/1992 | Kudoh et al. ............... 361/540 |
| 5,174,867 A * | 12/1992 | Naarmann et al. .......... 205/419 |
| 5,202,196 A | 4/1993 | Wang et al. | |
| 5,376,479 A | 12/1994 | Gerner | |
| 5,401,596 A | 3/1995 | Stoilov et al. | |
| 5,424,907 A * | 6/1995 | Kojima et al. ............... 361/532 |
| 5,429,886 A | 7/1995 | Struthers | |
| 5,523,181 A | 6/1996 | Stonehart et al. | |
| 5,648,011 A | 7/1997 | Blonsky | |
| 5,664,321 A | 9/1997 | Sielemann et al. | |
| 5,849,433 A | 12/1998 | Venugopal et al. | |
| 5,894,403 A | 4/1999 | Shah et al. | |
| 5,920,455 A | 7/1999 | Shah et al. | |
| 5,926,362 A | 7/1999 | Muffoletto et al. | |
| 5,965,299 A | 10/1999 | Khan et al. | |
| 6,219,222 B1 | 4/2001 | Shah et al. | |
| 6,232,019 B1 | 5/2001 | Wunder et al. | |
| 6,461,767 B1 | 10/2002 | Dansui et al. | |
| 6,687,117 B1 | 2/2004 | Liu et al. | |
| 6,721,169 B1 * | 4/2004 | Melody et al. ............... 361/512 |

OTHER PUBLICATIONS

"The Chemistry of Silica", Ier, Ralph K., John Wiley & Sons, 1979.

* cited by examiner

*Primary Examiner*—Nguyen T. Ha
(74) *Attorney, Agent, or Firm*—Michael F. Scalise

(57) ABSTRACT

A capacitor working electrolyte containing water and a silicate additive is described. The silicate additive does not alter the electrolyte properties and/or cause any separation of the electrolyte composition. Instead, it stabilizes capacitor long-term performance.

18 Claims, 3 Drawing Sheets

SILICATE ADDITIVES FOR CAPACITOR WORKING ELECTROLYTES

CROSS REFERENCE TO RELATED APPLICATION

This application claims priority to U.S. provisional patent application Ser. No. 60/544,446 filed Feb. 13, 2004.

BACKGROUND OF THE INVENTION

1. Field of the Invention

This invention is directed to a working electrolyte for electrolytic capacitors. In particular, this invention is directed to the addition of silicate additives to the working electrolyte.

It is known that the electrical properties of electrolytic capacitors containing liquid working electrolytes degrade with inactivity. This degradation increases charging time, DC leakage, and decreases charge/discharge energy efficiency. The degradation is believed caused by hydration of the dielectric oxide by water present in the working electrolyte. Dielectric oxide hydration is a particularly critical issue for certain capacitor applications including, but not limited to, cardioverter defibrillators where charging time and charge/discharge energy efficiency are important.

2. Prior Art

Electrolytic capacitors are well known for use in a variety of electronic equipment such as consumer audio and video equipment, home appliances, power supplies, industrial electronics, military electronics, computers, telecommunication equipment, entertainment equipment, automotive devices, lighting ballasts, and medical devices. In general, electrolytic capacitors comprise an anode and a cathode segregated by at least one layer of separator material impregnated with electrolyte.

The anode is a valve metal. Examples of valve metals include, but are not limited to, tantalum, aluminum, titanium, and niobium. The valve metal is coated with a thin layer of the corresponding oxide that serves as a dielectric. The oxide is normally formed by a technique known as anodizing. The oxide film thickness is proportional to the anodizing voltage. As a result of the anodizing process, the desired oxide film thickness determines the capacitor operation voltage, operation temperature, and other performance requirements. For a given oxide dielectric and film thickness, the volumetric capacitance or energy density of the capacitor is a function of the specific surface area of the anode. To achieve high volumetric capacitance, porous anodes are used such as etched aluminum foils for an aluminum capacitor and pressed and sintered tantalum powder bodies for a tantalum capacitor.

The electrolyte in an electrolytic capacitor is a critical component. It determines the capacitor working voltage, equivalent series resistance (ESR), energy efficiency, operation temperature range, and the stability and reliability of the capacitor during shelf and operation life.

Electrolytic capacitors are the choice for high voltage high-energy pulse applications such as required for flash cameras and cardiac defibrillators. Their drawback is, however, degradation of electrical properties during periods of non-operation. Degradation increases charging time (build time) and DC leakage, and decreases the energy efficiency of the charge/discharge cycle after a period of non-operation.

Degradation after non-operation is believed caused by hydration of the dielectric oxide film from water in the working electrolyte. Hydration converts the dielectric oxide to a hydrous oxide that will not support a desired high electric field. This results in an increase in charging time (build time) and DC leakage. Increased charging time also means a decrease of charge/discharge energy efficiency (the energy delivered during discharging divided by the energy put in during charging). This behavior is important for applications such as implantable cardioverter defibrillators (ICD) where charging time is critical for patients' lives and charge/discharge energy efficiency affects device life and device volume.

The chemical composition of the working electrolyte affects the rate of oxide degradation. Since water is needed in the electrolyte for the purpose of oxide reformation and better electrical conductivity, hydration of the dielectric oxide due to attack by water cannot be avoided completely. Desirably, the water content in the electrolyte should be kept at a minimum. However, there is a tradeoff between oxide hydration and other capacitor properties. Electrolyte pH is also an important determinant for the rate of oxide hydration and has to be controlled in an optimal range.

To minimize oxide degradation and maintain device charging time, a common practice for ICDs is to "reform" the dielectric oxide by periodically charging the capacitor to or near the working voltage, followed by discharge through a non-therapy load or by shelf discharge. This maintains charging time, but it also consumes battery energy.

The present invention solves the problem of dielectric oxide hydration by using silicate additives in the working electrolyte for electrolytic capacitors.

SUMMARY OF THE INVENTION

The present invention is directed to an electrolyte for electrolytic capacitors that contain water and silicate additives. The silicate additives improve capacitor stability by minimizing the water-oxide reaction (hydration) without affecting other capacitor properties and performance.

These and other aspects of the present invention will become more apparent to those skilled in the art by reference to the following description and to the appended drawings.

DETAILED DESCRIPTION OF THE PREFERRED EMBODIMENTS

Figure 1:
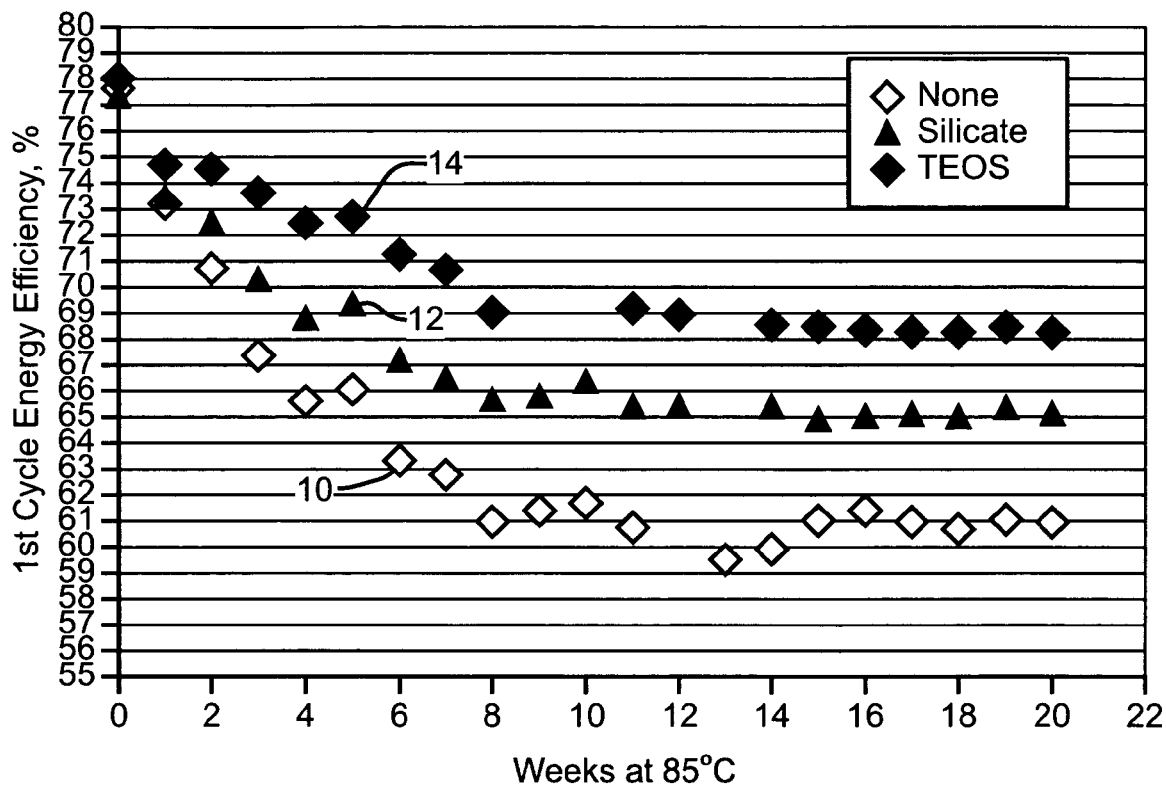
FIG. 1 is a graph of the first charge/discharge pulse energy efficiency at 37° C. versus storage time at 85° C. for three groups of 215 V capacitors, one having a conventional working electrolyte, the other two with working electrolytes containing silicate additives.

For the purpose of this invention, the term "gel" is defined as a colloid in a more solid form than a sol. A "sol" is a fluid colloidal system especially one in which the continuous phase is a liquid.

The present invention is directed to minimizing degradation or hydration of a dielectric oxide film to improve capacitor performance stability. This is achieved by adding silicate and/or silica sol additives into the working electrolyte for electrolytic capacitors. Solid electrolytic capacitors, such as those using $MnO_2$ and conductive polymer solid electrolytes, do not normally contain water. However, this principle may still be applicable to the solid electrolytic capacitors if moisture affects the capacitor performance.

The silicates of the present invention are used as an additive to stabilize capacitor long-term performance. The ability of silicate additives to do this is a result of surface modification of the dielectric oxide film by the silicate molecule or silica particles. It is believed that the silicate molecules or silica particles form a coating through Ta—O—Si binding at the oxide surface that minimizes attack of the oxide by water in the electrolyte.

Since the silicate (silica sol) is being used as an additive at relatively low concentrations (typically less than one percent by weight), the silicate (silica sol) additives have little or no effect on the chemical, physical and electrical properties of the bulk electrolytes.

The silicates of the present invention include, and are not limited to: 1) inorganic silicate such as ammonium silicate and sodium silicate, 2) organic silicates having a general formula of $(R_1O—)(R_2O—)$ $(R_3O—)$ $(R_4O—)Si$, wherein $R_1$, $R_2$, $R_3$, and $R_4$ may be the same or different and are selected from the group consisting of methyl, ethyl, propyl, isopropyl, butyl, isobutyl, tert-butyl, and combinations thereof. Suitable compounds include, but are not limited to, tetramethyl orthosilicate ($Na_2SiO_3$) and tetraethyl orthosilicate (TEOS), and 3) silica sols.

Silicate compounds form silica sole and gels in water-containing electrolytes depending on concentration of silicate compounds, electrolyte composition, pH, temperature, and time. When a silicate compound is dissolved in a water-containing electrolyte, the monomer $Si(OH)_4$ polymerizes to high molecular weight round-shaped particles. Depending on solution composition and pH, the particles can grow to radii of up to about 100 nm. Silica sole (colloidal silica) are non-settling dispersions of silica particles. The sols can develop to gels by condensation of the sol particles and formation of chains, and ultimately, three-dimensional gel networks. Detailed information can be found in the book "The Chemistry of Silica" written by Ralph K. Iler.

Formation of silica gels increases electrolyte viscosity and causes electrolyte separation and is not desired for capacitor electrolyte, at least for electrolytes before being filled (impregnated) into capacitors. Formation of gels also causes increase of electrolyte resistivity that increases capacitor equivalent series resistance (ESR), decreases energy delivery, and decreases charge discharge energy efficiency. To avoid the formation of silica gels, electrolyte composition, pH, concentration of the silicate additives, and storage conditions have to be carefully controlled. In a preferred embodiment of the present invention, gels are undesirable attributes.

The silicate additive concentration ranges, by weight, from about 0.01% to about 5% of the electrolyte, preferably less than about 1%, more preferably about 0.5%, or less. The weight percentage is normally controlled sufficiently low not to create gels. Significant amounts of gel alter electrolyte properties such as increasing electrolyte resistivity and causing separation, which are undesirable characteristics. Inorganic silicates are poorly soluble in aqueous working electrolytes and their presence tends to form the electrolyte into a gel. Preferred are the organic silicates. While they are more soluble than inorganic silicates, they also tend to form gels at too high concentrations in the working electrolyte composition.

The silicate additives of the present invention can, in principle, be incorporated into any type of working electrolyte for an electrolytic capacitor such as those for high voltage tantalum electrolytic capacitor described in U.S. Pat. No. 6,219,222 to Shah et al. and U.S. Pat. No. 6,687,117 to Liu et al. These patents are assigned to the assignee of this invention and incorporated herein by reference. The silicate additives of the present invention can be used in electrolytic capacitors of other valve metals such as aluminum, niobium, and titanium to achieve the similar benefits.

An exemplary electrolyte contains at least the following constituents, by weight: about 1% to about 80% of water, preferably de-ionized, and 0% to about 80% of an organic solvent along with about 1% to about 80% of ionogenic solutes, and a silicate.

Suitable organic solvents include, but are not limited to, glycols, glycol ethers, polyethylene glycols, amides, esters, nitriles, linear carbonates, cyclic carbonates, and mixtures thereof.

Suitable glycols include, but are not limited to, ethylene glycol, diethylene glycol, propylene glycol, trimethylene glycol, glycerol, and mixtures thereof.

Suitable glycol ethers include, but are not limited to, ethylene glycol monomethyl ether, ethylene glycol monoethyl ether, propylene glycol methyl ether, diethylene glycol methyl ether, dipropylene glycol methyl ether, glycol monobutyl ether, and mixtures thereof.

Suitable amides include formamide, dimethyl formamide, diethyl formamide, ethyl formamide, dimethyl acetamide, methyl acetamide, and mixtures thereof.

Suitable nitriles include acetonitrile, propionitrile, and mixtures thereof.

Cyclic esters such as γ-butyrolactone, γ-valerolactone and N-methyl-2-pyrrolidone are also useful solvents or co-solvents as are carbonates, both linear and cyclic. Suitable linear and cyclic carbonates include, but are not limited to, dimethyl carbonate, diethyl carbonate, ethyl methyl carbonate, dipropyl carbonate, ethyl propyl carbonate, methyl propyl carbonate, propylene carbonate, ethylene carbonate, butylenes carbonate, vinylene carbonate, and mixtures thereof.

Suitable ionogenic solutes include, but are not limited to, inorganic acids and salts, such as sulfuric acid, phosphoric acid, ammonium phosphates; organic carboxylic acids and their salts. Example of carboxylic acid include, but are not limited to, acetic acid, butyric acid, propionic acid, valeric acid (pentanoic acid), methylbutyric acid, trimethylacetic acid, and mixtures thereof. The ammonium salts of the acids mentioned above can be produced in situ by reacting with ammonium hydroxide or ammonia. Electrolyte pH and conductivity can be adjusted by the amount of ammonium hydroxide.

The present electrolytes are not only useful for conventional electrolytic capacitors, but also those of the electrolytic/electrochemical hybrid type. Capacitor cathodes commonly used in electrolytic capacitors include etched aluminum foil in aluminum electrolytic capacitors, and those commonly used in wet tantalum capacitors such as of silver, sintered valve metal powders, platinum black, and carbon. The cathode of hybrid capacitors include a pseudocapacitive coating of a transition metal oxide, nitride, carbide or carbon nitride, the transition metal being selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, and mixtures thereof. The pseudocapacitive coating is deposited on a conductive substrate such as of titanium or tantalum. The electrolytic/electrochemical hybrid capacitor has high energy density and is particularly useful for implantable medical devices such as a cardiac defibrillator.

The anode is of a valve metal selected from tantalum, aluminum, titanium, niobium, zirconium, and hafnium. The anode can be a foil, etched foil, sintered powder, or any other form of porous substrate of these metals.

A preferred chemistry for a hybrid capacitor comprises a cathode electrode of a porous ruthenium oxide film provided on a titanium substrate coupled with an anode of a sintered tantalum powder pressed into a pellet. A suitable separator material impregnated with the present working electrolyte separates the cathode and anode electrodes from each other. Such a capacitor is described in U.S. Pat. No. 5,894,403 to Shah et al., U.S. Pat. No. 5,920,455 to Shah et al. and U.S. Pat. No. 5,926,362 to Muffoletto et al. These patents are assigned to the assignee of the present invention and are incorporated herein by reference.

Electrolytes of the present invention may also contain phosphoric acid, an inorganic phosphate or an organic phosphate as an additive to improve anode stability. Examples of suitable organic phosphates are trimethylphosphate, triethylphosphate, triisopropylphosphate, and mixtures thereof.

The present electrolytes may contain a nitroaromatic depolarizer to prevent cathodic gassing during operation. Suitable nitroaromatic compounds include, but are not limited to, 2-nitrophenol, 3-nitrophenol, 4-nitrophenol, 2-nitrobenzonic acid, 3-nitrobenzonic acid, 4-nitrobenzonic acid, 2-nitroacetophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and mixtures thereof.

The electrolyte is useful for capacitors having an operating range of at least about 175 volts. The preferred ruthenium oxide/tantalum hybrid capacitor provides high energy density at voltages of at least about 175 volts, such as is required in an implantable medical device, for example, a cardiac defibrillator. For this reason, it is important that the electrolyte have a high breakdown voltage, high conductivity, suitable pH and good chemical stability over the operating life of the medical device.

The silicates, silica sols, and silica gels are chemically inert species. The present electrolyte is chemically compatible over time with the other capacitor components and capacitor materials, even at temperatures of about 105° C. This means that the electrolyte does not generate gas or promote corrosion of the other capacitor components at that temperature.

The following examples describe the manner and process of an electrochemical cell according to the present invention, and set forth the best mode contemplated by the inventors of carrying out the invention.

EXAMPLE I

To compare the performance stability of working electrolytes with and without silicate additives, tests were conducted using 215 V rated tantalum capacitors. These capacitors are commercially available from Wilson Greatbatch Technologies, Inc., Clarence, N.Y. The capacitors contained a ruthenium oxide cathode and a sintered tantalum pellet anode. The working electrolyte contained, by weight: 47.6% water, 25.0% ethylene glycol, 13.4% ammonium acetate, 0.4% phosphoric acid, 13.8% acetic acid, and 0.3% 4-nitrophenol.

Three electrolyte types were compared. As shown in Table 1, the control electrolyte was without additive. The second electrolyte was saturated with the inorganic silicate compound sodium metasilicate ($Na_2SiO_3$) and the third contained 0.2 wt % of the organic tetraethyl orthosilicate (TEOS).

TABLE 1

| Additive | Weight % | # of Caps. |
|---|---|---|
| None | 0 | 3 |
| $Na_2SiO_3$ | Saturated | 7 |
| TEOS | 0.2 | 7 |

The capacitors were then subjected to an acceptance test consisting of a 10 mA charging current to their working voltage at 37° C. and then discharging them through a 16.7-ohm load resistor. The energy efficiency is the total energy delivered during discharging by the total energy put in during charging. The capacitors were tested weekly by applying a charge/discharge cycle.

FIG. 1 is a graph of the average first charge/discharge pulse energy efficiency at 37° C. versus storage time at 85° C. for the 215 V tantalum capacitors containing the respective working electrolytes. Curve 10 was constructed from the average of the control capacitors, curve 12 was from the average of the second group containing the inorganic silicate and curve 14 was from the capacitors containing TEOS.

FIG. 1 clearly illustrates that organic silicates are the preferred additives for improving capacitor performance stability. The improvement is significant over the working electrolyte with no additive. Moreover, use of the organic silicate TEOS is significant over the inorganic compound sodium metasilicate. However, both silicate-containing working electrolytes are significantly better than the one devoid of a silicate additive.

EXAMPLE II

Prior to the accelerated life test shown in FIG. 1, all of the capacitors were tested for initial electrical properties (acceptance test). The acceptance test includes DC leakage, charge/discharge cycling, ESR, and AC capacitance. The DC leakage test (DCL) was measured by charging the capacitors at 10 mA to their rated voltage at 37° C. The DCL is the current after 5 minutes at the rated voltage. The ESR and AC capacitance reading were taken at 120 Hz, 50 mV signal with a 2 volt DC bias at room temperature.

The acceptance ESR, AC capacitance, and 5 min DC leakage data results for the respective capacitors are summarized in Table 2. No significant difference was seen between the three groups, implying that the silicate additives had no statistically significant effect on capacitor electrical properties.

The AC capacitance, ESR, and DCL values were also measured after a 20-week, 85° C. accelerated life test. The average values are summarized in Table 3.

TABLE 2

Acceptance ESR, AC capacitance, and 5 min DCL values for silicate additives and no additive

| ADDITIVE | DCL | ACCap | ESR |
|---|---|---|---|
| None | 51.63 | 430.74 | 1.42 |
| None | 47.70 | 437.24 | 1.19 |
| None | 48.51 | 444.03 | 1.17 |
| Average | 49.28 | 437.34 | 1.26 |
| $Na_2SiO_3$ | 55.09 | 445.65 | 1.16 |
| $Na_2SiO_3$ | 58.81 | 445.52 | 1.19 |
| $Na_2SiO_3$ | 56.94 | 440.19 | 1.19 |
| $Na_2SiO_3$ | 52.70 | 442.07 | 1.18 |
| $Na_2SiO_3$ | 58.57 | 443.67 | 1.18 |
| $Na_2SiO_3$ | 43.84 | 438.50 | 1.21 |
| $Na_2SiO_3$ | 44.56 | 436.94 | 1.21 |
| Average | 52.93 | 441.79 | 1.19 |
| TEOS | 49.74 | 441.82 | 1.24 |
| TEOS | 43.68 | 442.13 | 1.21 |
| TEOS | 48.45 | 440.54 | 1.21 |
| TEOS | 41.45 | 435.15 | 1.24 |
| TEOS | 45.92 | 437.93 | 1.23 |
| TEOS | 44.94 | 442.74 | 1.21 |
| TEOS | 47.83 | 439.81 | 1.21 |
| Average | 46.00 | 440.02 | 1.22 |

TABLE 3

Electrical properties after the accelerated life test

| Additive | Wt % | ACCap Accept. | ACCap Post Test | ACCap Ratio to Initial | ESR Accept. | ESR Post Test | ESR Ratio to Initial | 5 min DCL Post Test |
|---|---|---|---|---|---|---|---|---|
| None | | 440.63 | 415.67 | 94.3% | 1.18 | 1.41 | 120% | 194.75 |
| $Na_2SiO_3$ | Saturated | 441.48 | 420.45 | 96.4% | 1.19 | 1.34 | 113% | 155.35 |
| TEOS | 0.20% | 440.02 | 429.48 | 97.6% | 1.22 | 1.30 | 106% | 113.36 |

FIG. 1 and Tables 2 and 3 illustrate that addition of silicate additives with an aqueous working electrolyte, and in particular the addition of organic silicates, results in decreased oxide hydration. This is in respect to capacitors having working electrolytes devoid of silicate additives.

EXAMPLE III

Figure 2:
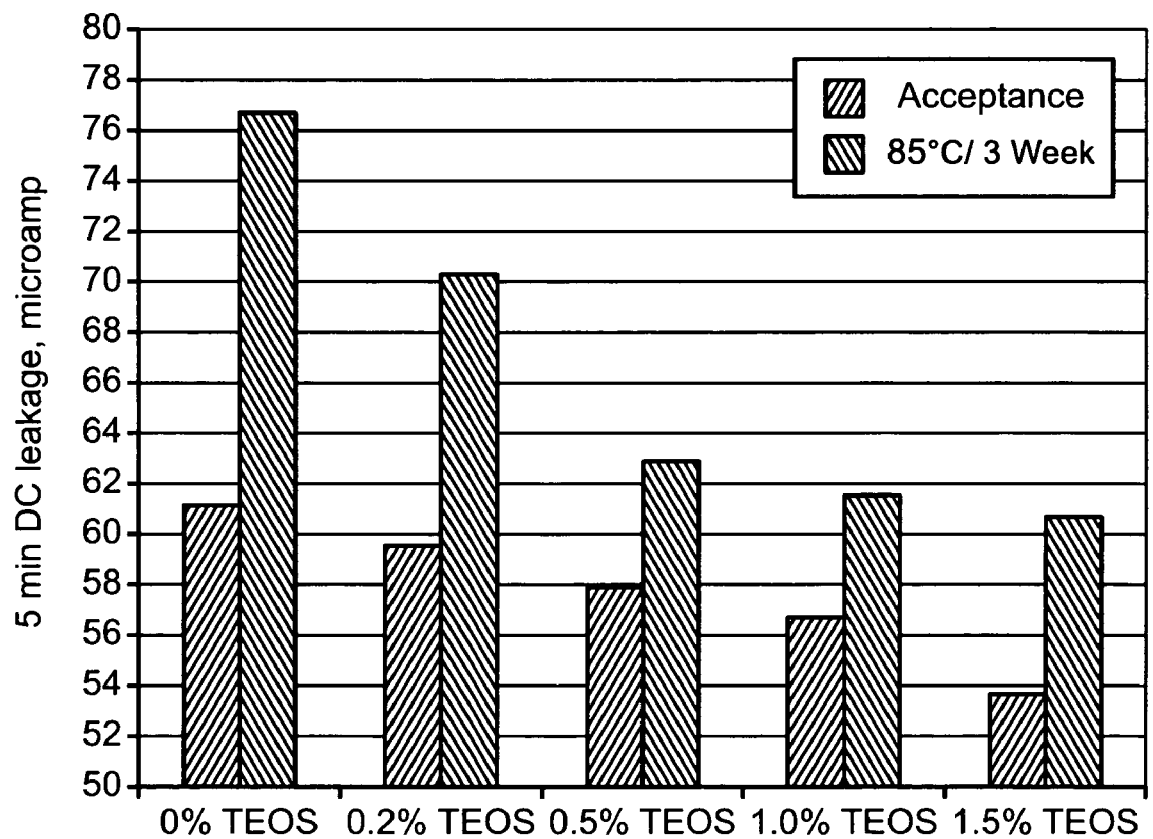
FIG. 2 is a bar graph comparing DC leakage data for electrolytic capacitors with various concentrations of an organic silicate additive at acceptance test and after storage at 85° C. for three weeks.
Figure 3:
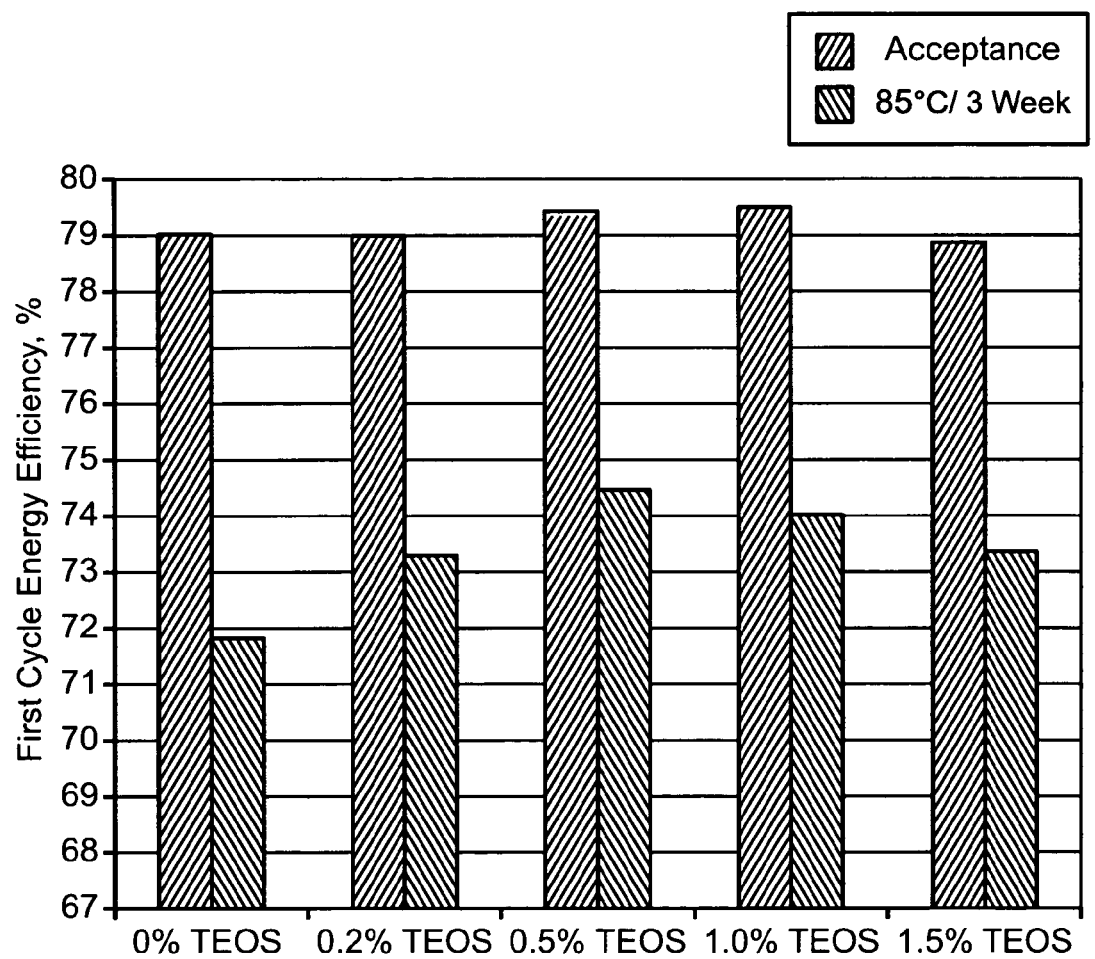
FIG. 3 is a bar graph comparing first cycle energy efficiency for the capacitors used in FIG. 2.

FIGS. 2 and 3 are bar graphs illustrating capacitor DC leakage and charge discharge energy efficiency at acceptance and after storage at 85° C. for three weeks for the 215 V capacitors similar to those used in Examples I and II. The capacitors contained working electrolytes with various concentrations of TEOS up to 1.5% by weight. The data shows that the addition of TEOS in the working electrolyte reduces capacitor DC leakage and stabilizes charge discharge energy efficiency.

Thus, it is apparent from the comparative test data presented in Examples I to III that silicate additives provided in an aqueous working electrolyte according to the present invention significantly improve the performance of electrolytic capacitors. This is believed to be as a result of the silicate molecules or silica particles forming a coating through Ta—O—Si binding at the oxide surface that minimizes attack of the oxide by water in the electrolyte.

It is appreciated that various modifications to the inventive concepts described herein may be apparent to those skilled in the art without departing from the spirit and the scope of the present invention defined by the hereinafter appended claims.

What is claimed is:

1. A working electrolyte for an electrolytic capacitor, the electrolyte comprising:
    a) water; and
    b) a silicate compound selected from ammonium silicate and an organic compound having the chemical formula: $(R_1O-)(R_2O-)(R_3O-)(R_4O-)Si$, wherein $R_1$, $R_2$, $R_3$, and $R_4$ may be the same or different and they are selected from the groups consisting of methyl, ethyl, propyl, isopropyl, butyl, isobutyl, tert-butyl, and combinations thereof.

2. The electrolyte of claim 1 wherein the silicate compound is at a concentration from about 0.01%, by weight, to being saturated in the electrolyte.

3. The electrolyte of claim 1 wherein the silicate compound is at a concentration from about 0.01% to about 5%, by weight.

4. The electrolyte of claim 1 wherein the silicate compound is at a concentration less than about 0.5%, by weight.

5. The electrolyte of claim 1 not in the form of a gel upon being provided in the capacitor.

6. The electrolyte of claim 1 wherein the silicate compound is in the form of a silica sol.

7. A working electrolyte comprising, by weight:
    a) about 0.1% to about 80% water;
    b) 0% to about 80% of an organic solvent;
    c) about 1% to about 80% of at least one ionogenic solute; and
    d) a silicate compound selected from ammonium silicate and an organic compound having the chemical formula: $(R_1O-)(R_2O-)(R_3O-)(R_4O-)Si$, wherein $R_1$, $R_2$, $R_3$, and $R_4$ may be the same or different and they are selected from the groups consisting of methyl, ethyl, propyl, isopropyl, butyl, isobutyl, tert-butyl, and combinations thereof.

8. The electrolyte of claim 7 wherein the silicate compound is at a concentration from about 0.0.1%, by weight, to being saturated in the electrolyte.

9. The electrolyte of claim 7 wherein the silicate compound is at a concentration from about 0.01% to about 5%, by weight.

10. The electrolyte of claim 7 wherein the silicate compound is at a concentration less than about 0.5%, by weight.

11. The electrolyte of claim 7 wherein the electrolyte is used with a capacitor system powering an implantable medical device.

12. The electrolyte of claim 7 not in the form of a gel.

13. The electrolyte of claim 7 wherein the silicate compound is in the form of a silica sol.

14. A method for preparing a working electrolyte for a capacitor, comprising the steps of:
   a) providing, by weight, about 0.1% to about 80% water, 0% to about 80% of an organic solvent, and about 1% to about 80% of at least one ionogenic solute; and
   b) adding to the electrolyte a silicate compound selected from ammonium silicate and an organic compound having the chemical formula: $(R_1O\text{---})(R_2O\text{---})(R_3O\text{---})(R_4O\text{---})Si$, wherein $R_1$, $R_2$, $R_3$, and $R_4$ may be the same or different and they are selected from the groups consisting of methyl, ethyl, propyl, isopropyl, butyl, isobutyl, tert-butyl, and combinations thereof.

15. The method of claim 14 including providing the silicate compound at a concentration from about 0.01%, by weight, to being saturated in the electrolyte.

16. The method of claim 14 including providing the silicate compound at a concentration from about 0.01% to about 5%, by weight.

17. The method of claim 14 including providing the electrolyte not being in the form of a gel.

18. The electrolyte of claim 14 including providing the silicate compound in the form of a silica sol.

* * * * *